(12) United States Patent
Ozawa et al.

(10) Patent No.: US 10,035,556 B2
(45) Date of Patent: Jul. 31, 2018

(54) FUEL TANK OF STRADDLE TYPE VEHICLE

(71) Applicant: HONDA MOTOR CO., LTD., Tokyo (JP)

(72) Inventors: Eiji Ozawa, Wako (JP); Ryuji Masuda, Tochigi (JP)

(73) Assignee: HONDA MOTOR CO., LTD., Tokyo (JP)

( * ) Notice: Subject to any disclaimer, the term of this patent is extended or adjusted under 35 U.S.C. 154(b) by 160 days.

(21) Appl. No.: 15/245,489

(22) Filed: Aug. 24, 2016

(65) Prior Publication Data

US 2017/0057584 A1    Mar. 2, 2017

(30) Foreign Application Priority Data

Aug. 31, 2015  (JP) .................................. 2015-170666

(51) Int. Cl.
| | |
|---|---|
| B62J 35/00 | (2006.01) |
| B62J 25/00 | (2006.01) |
| B60K 15/073 | (2006.01) |

(52) U.S. Cl.
CPC ............. *B62J 35/00* (2013.01); *B60K 15/073* (2013.01); *B62J 25/00* (2013.01)

(58) Field of Classification Search
CPC ....................................................... B62J 35/00
See application file for complete search history.

(56) References Cited

U.S. PATENT DOCUMENTS 5,944,216 A    8/1999 Inaoka et al.

FOREIGN PATENT DOCUMENTS

| JP | H11-321752 A | 11/1999 |
|---|---|---|
| JP | 2001-114168 A | 4/2001 |
| JP | 2005-59031 A | 3/2005 |
| JP | 2015-123893 A | 7/2015 |

*Primary Examiner* — Kevin Hurley
(74) *Attorney, Agent, or Firm* — Westerman, Hattori, Daniels & Adrian, LLP (57) ABSTRACT

A fuel tank of a straddle type vehicle, whose die for bending a body can be drawn from the tank easily, and whose knee grip part can be formed easily is provided. A body is formed by integrally joining, at the center in the vehicle width direction, body half bodies divided into two in the vehicle width direction, a body flange to be placed on and welded to a bottom, is formed on the entire outer circumferential edge of the body, a rear part (specifically, a rear lateral welding portion side) of a side part (lateral welding portion side) of the body flange protrudes inward in the vehicle width direction toward the obliquely lower direction, and a part of the side part other than the rear part (specifically, a front lateral welding portion side) of the body flange protrudes inward in the vehicle width direction toward the obliquely upper direction.

9 Claims, 8 Drawing Sheets

FUEL TANK OF STRADDLE TYPE VEHICLE

TECHNICAL FIELD

The present disclosure relates to a fuel tank of a straddle type vehicle.

BACKGROUND

Heretofore, a structure has been disclosed (see Japanese Patent Application Publication No. 2005-59031, for example) in which, when forming a fuel tank by placing a body (outer plate) on top of a bottom (bottom plate) and welding the overlapping part, an edge part of the body is bent horizontally inward in the vehicle width direction, and is further bent upward, so that the welded part is not visible.

SUMMARY

Since the edge of the body on the inner side in the vehicle width direction is bent upward in the Japanese Patent Application Publication No. 2005-59031, it is difficult to draw a die from the formed body after bending the inner edge of the body with the die. Although a split die may be used to draw the die from the formed body, for example, this increases the number of parts, and increases cost and man-hours for administration.

Also, when bending the body or bottom, it is difficult to form a part having a hollow cross section enclosing narrow space, and therefore a knee grip part of a fuel tank tends to become wide in the vehicle width direction, even though it is desired to be narrow in the vehicle width direction, for example.

It is preferable to provide a fuel tank of a straddle type vehicle, whose die for bending a body can be drawn easily from the tank, and whose knee grip part can be formed easily.

To solve the above problem, one aspect of the embodiments is a fuel tank of a straddle type vehicle including a body frame (11) in which a main frame (22) is connected to a rear part of a headpipe (21), a fuel tank (41) and a seat (42) being supported to the body frame (11) in this order from the front at the rear of the head pipe (21), the fuel tank being formed by placing a body (85), which is formed of an outer plate on the upper side, on top of a bottom (87), which is formed of a bottom plate on the lower side, and welding them together, and the rear end of the fuel tank being arranged below the seat (42), characterized in that: the body (85) is formed by integrally joining laterally divided parts (85L, 85R) divided into two in the vehicle width direction; a body joint portion (85b) to be placed on and welded to the bottom (87) is formed on the entire outer circumferential edge of the body (85); a rear part of a side part of the body joint portion (85b) protrudes inward in the vehicle width direction toward the obliquely lower direction; and a part of the side part other than the rear part of the body joint portion (85b) protrudes inward in the vehicle width direction toward the obliquely upper direction.

In the above configuration, each of the body (85) and the bottom (87) may include a side wall (85c, 87c); the body joint portion (85b) may be formed in a lower end part of the side wall (85c) of the body (85); a bottom joint portion (87b) to be placed on and welded to the body joint portion (85b), may be formed in a lower end part of the side wall (87c) of the bottom (87); the body joint portion (85b) and the bottom joint portion (87b) may be welded to form a welding surface (89e); a knee grip portion (85a) may be formed in the side wall (85c) of the body (85) from a longitudinal center part to a rear part thereof; and in the knee grip portion (85a), the body joint portion (85b), which is bent substantially horizontally inward in the vehicle width direction, and the bottom joint portion (87b), which is bent substantially horizontally outward in the vehicle width direction, may be placed on top of one another and be welded together.

Also, in the above configuration, the knee grip portion (85a) may be formed such that it is wider in the vehicle width direction on the lower side than on the upper side; and the body joint portion (85b) may be bent at a moderate angle directed below the horizontal.

Also, in the above configuration, a design surface (85n) may be formed along the welding surface (89e).

Also, in the above configuration, the welding surface (89e) facing the head pipe (21) may be provided in a front part of the fuel tank (41).

Also, in the above configuration, the welding surface (89e) facing the head pipe (21) may be directed toward the obliquely lower direction.

Also, in the above configuration, an engine (51) may be arranged below the fuel tank (41); and a cylinder portion (53) of the engine (51) may project farther outward in the vehicle width direction than the welding surface (89e).

Also, in the above configuration, the welding surface (89e) formed in a welding portion (89) between the body joint portion (85b) and the bottom joint portion (87b) may have a continuously varying tilt angle, and may therefore be directed inward in the vehicle width direction toward the obliquely lower direction in a position in front of the knee grip portion (85a), and be directed outward in the vehicle width direction toward the obliquely lower direction in a position behind the knee grip portion (85a). In the above explanation of the exemplary embodiment, specific elements with their reference numerals are indicated by using brackets. These specific elements are presented as mere examples in order to facilitate understanding, and thus, should not be interpreted as any limitation to the accompanying claims.

The body is formed by integrally joining the laterally divided parts divided into two in the vehicle width direction, the body joint portion to be placed on and welded to the bottom, is formed on the entire outer circumferential edge of the body, a rear part of a side part of the body joint portion protrudes inward in the vehicle width direction toward the obliquely lower direction, and a part of the side part other than the rear part of the body joint portion protrudes inward in the vehicle width direction toward the obliquely upper direction. Hence, when forming each of the laterally divided parts, the die can be drawn easily from the rear part side of the side part of the body joint portion, even when the die for bending the body joint portion is an integral die.

Also, each of the body and the bottom includes the side wall, the body joint portion is formed in the lower end part of the side wall of the body, the bottom joint portion to be placed on and welded to the body joint portion, is formed in the lower end part of the side wall of the bottom, the body joint portion and the bottom joint portion are welded to form the welding surface, the knee grip portion is formed in the side wall of the body from the longitudinal center part to the rear part thereof, and in the knee grip portion, the body joint portion, which is bent substantially horizontally inward in the vehicle width direction, and the bottom joint portion, which is bent substantially horizontally outward in the vehicle width direction, are placed on top of one another and welded together. Hence, the welding portion can be formed by bending the body joint portion and the bottom joint portion substantially horizontally, placing them on top of one another, and welding them together. Since the conventional steps of bending the parts substantially horizontally and then bending them vertically are eliminated, the body and bottom require less bending steps. Also, by forming the knee grip portion in this manner, the side walls of the body and the bottom can be brought closer to each other than to form the knee grip portion by bending a single member. This allows the knee grip portion to bulge less toward the outer side in the vehicle width direction.

Also, the knee grip portion is formed such that it is wider in the vehicle width direction on the lower side than on the upper side, and the body joint portion is bent at a moderate angle directed below the horizontal. Hence, the die for bending can be drawn easily from the edge part of the body, and the lower end part of the body can be made less recognizable.

Also, since the design surface is formed along the welding surface, the welding surface can be made less recognizable.

Also, since the welding surface facing the head pipe is provided in the front part of the fuel tank, the clearance between the welding surface and the head pipe can be reduced, and the tank volume can be enlarged.

Also, since the welding surface facing the head pipe is directed toward the obliquely lower direction, the welding surface can be made less recognizable.

Also, the engine is arranged below the fuel tank, and the cylinder portion of the engine projects farther outward in the vehicle width direction than the welding surface. Hence, the welding surface is less likely to be viewed from the obliquely lower direction on the outer side in the vehicle width direction, and is made less recognizable.

Also, the welding surface formed in the welding portion between the body joint portion and the bottom joint portion has a continuously varying tilt angle, and therefore is directed inward in the vehicle width direction toward the obliquely lower direction in a position in front of the knee grip portion, and is directed outward in the vehicle width direction toward the obliquely lower direction in a position behind the knee grip portion. Hence, by continuously varying the tilt angle of the welding surface, bending and welding work of the body joint portion and the bottom joint portion can be performed efficiently, and workability can be improved.

BRIEF DESCRIPTION OF THE DRAWINGS

FIGS. 3A, 3B show explanatory drawings for describing the fuel tank, where

FIGS. 5A, 5B show cross-sectional views of lateral welding portions of the fuel tank, where

FIGS. 7A, 7B, 7C show drawings for describing a front welding portion of the fuel tank, where

FIGS. 8A, 8B show drawings for describing a rear welding portion of the fuel tank, where

DETAILED DESCRIPTION

Hereinafter, an embodiment of the present application will be described with reference to the drawings. Note that in the description, directions such as the front and rear, right and left, and upper and lower are the same as those relative to the vehicle body, unless otherwise specified. Also, in the drawings, reference sign FR indicates the front of the vehicle body, reference sign UP indicates the upper direction of the vehicle body, and reference sign LH indicates the left of the vehicle body.

Figure 1:
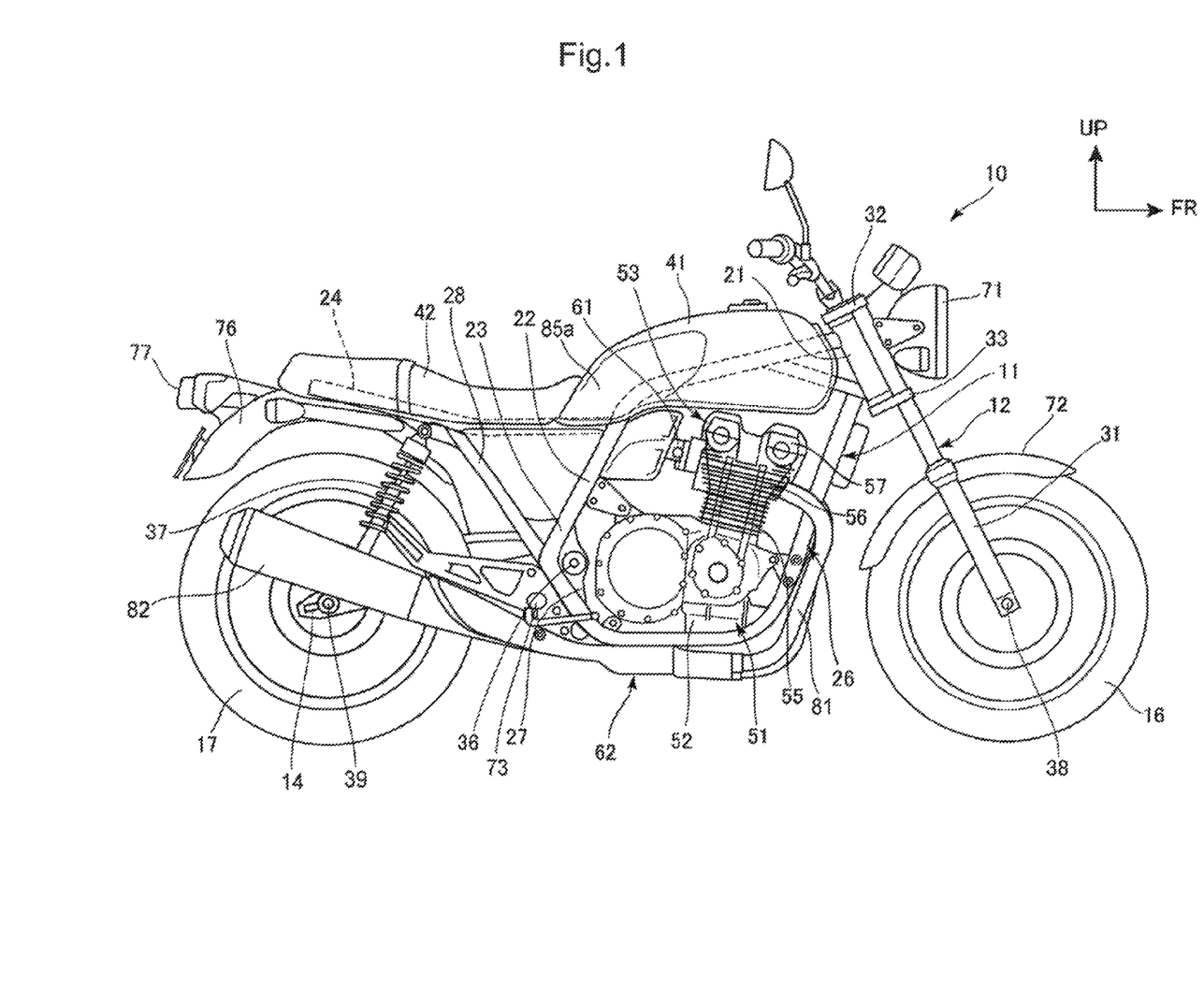
FIG. 1 is a right side view of a motorcycle including a fuel tank of one embodiment.

FIG. 1 is a right side view of a motorcycle 10 including a fuel tank 41 of the embodiment.

The motorcycle 10 is a straddle type vehicle, in which a front fork 12 is provided in a front end part of a body frame 11, a swing arm 14 is provided in a lower part of the body frame 11, a front wheel 16 is supported by a lower end part of the front fork 12, and a rear wheel 17 is supported by a rear end part of the swing arm 14.

The body frame 11 includes a head pipe 21, paired right and left main frames 22, paired right and left center frames 23, paired right and left seat rails 24, paired right and left down frames 26, paired right and left pivot plates 27, and paired right and left rear frames 28.

The head pipe 21 constitutes a front end part of the body frame 11, and the front fork 12 is supported by the head pipe 21 in a right-left steerable manner. The right and left main frames 22 each extends obliquely downward to the rear from an upper part of the head pipe 21. The center frame 23 extends downward while being formed integrally with a lower part of the main frame 22. The seat rails 24 support a seat 42. The down frame 26 is connected to a lower part of the head pipe 21, extends obliquely downward to the rear and rearward below the main frame 22, and is connected to the center frame 23. The pivot plate 27 is attached to a front part of the center frame 23, and supports a pivot shaft 36 extending in the vehicle width direction. A front end part of the swing arm 14 is supported by the pivot shaft 36 in a vertically swingable manner. The rear frame 28 extends obliquely upward to the rear from a bent part of the center frame 23, and is connected to the seat rail 24.

The front fork 12 is configured of paired right and left telescopic fork tubes 31, a top bridge 32 and bottom bridge 33 connecting the right and left fork tubes 31, and a steering stem (not shown) connecting the top bridge 32 and bottom bridge 33 in the vertical direction. The steering stem is rotatably inserted into the head pipe 21. The front wheel 16 is supported by the lower end part of the front fork 12, through an axle 38.

A lower end part of a rear cushion unit 37 is connected to a rear end part of the swing arm 14, and the rear wheel 17 is supported by the rear end part of the swing arm 14 through an axle 39. An upper end part of the rear cushion unit 37 is connected to the body frame 11 below the seat 42.

The fuel tank 41 arranged behind the head pipe 21, and the seat 42 arranged behind the fuel tank 41 are supported by upper parts of the body frame 11.

A multi-cylinder engine 51 is arranged in a space, which is below the fuel tank 41 and surrounded by the body frame 11.

The engine 51 is supported by the main frames 22, the down frames 26, and other parts, and includes a crankcase 52, and a cylinder portion 53 raised from a front part of the crankcase 52. The cylinder portion 53 includes a cylinder block 55, a cylinder head 56, and a head cover 57 arranged in this order from the crankcase 52 side.

The cylinder head 56 has multiple intake ports (not shown) opened in a rear part thereof and connected to intake system 61, and multiple exhaust ports (not shown) opened in a front part thereof and connected to an exhaust system 62. The intake system 61 is formed of a throttle body, an air cleaner box, and other parts. The exhaust system 62 is configured of multiple exhaust pipes 81 extending frontward, downward and rearward from the cylinder head 56, and a muffler 82 connected to rear end parts of the exhaust pipes 81.

In FIG. 1, reference numeral 71 indicates a headlight, 72 indicates a front fender covering an upper part of the front wheel 16, 73 indicates a rider's step, 76 indicates a rear fender covering an upper part of the rear wheel 17, and 77 indicates a tail lamp.

Figure 2:
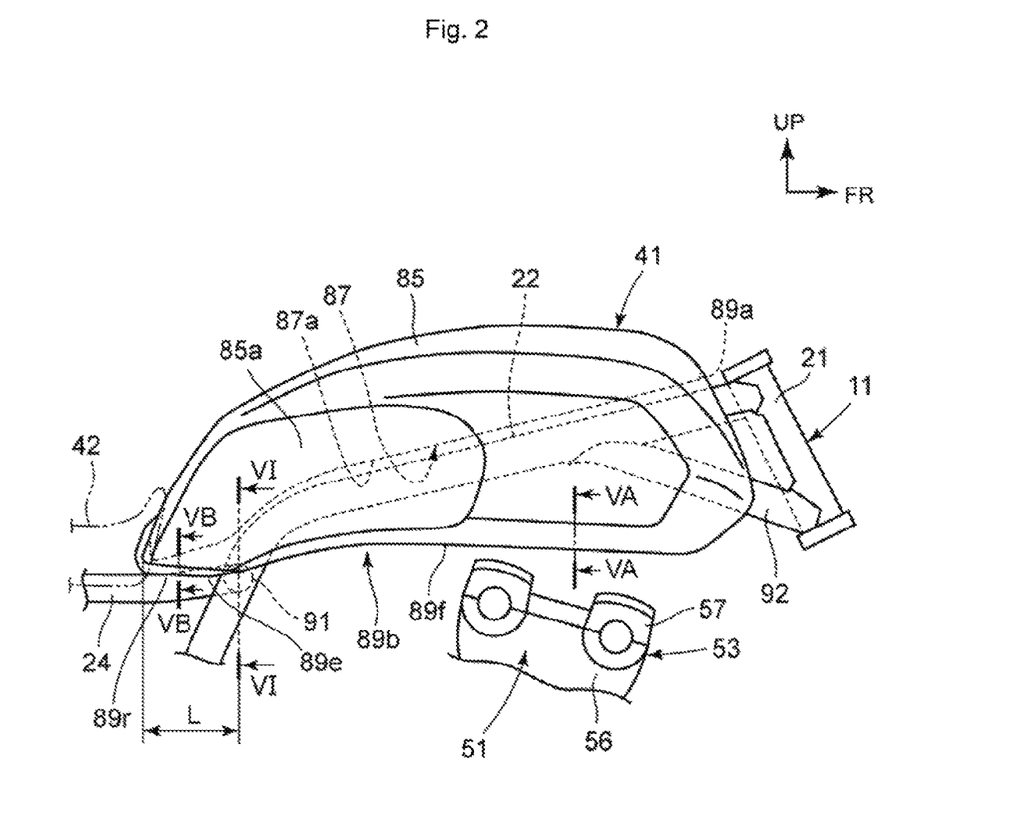
FIG. 2 is a right side view of main parts of the fuel tank and its periphery.

FIG. 2 is a right side view of main parts of the fuel tank 41 and its periphery.

The fuel tank 41 has a front end part close to the rear of the head pipe 21, extends longitudinally to cover an area from front end parts of the right and left main frames 22 to front parts of the right and left seat rails 24 from above, and is supported by the body frame 11. A rear end part of the fuel tank 41 is covered by a front end part of the seat 42 from above and from behind.

Also, the fuel tank 41 is formed by welding together a body 85 as a press molded outer plate forming the outside of the fuel tank, and a bottom 87 as a press molded bottom plate arranged on the inner side of the body 85.

Paired right and left recessed knee grip portions 85a to be gripped by the rider's knees are formed in a rear part of the body 85. The bottom 87 is arranged close to and above the main frames 22 and seat rails 24, such that a bottom upper wall 87a in an upper part of the bottom extends along the right and left main frames 22 and right and left seat rails 24.

The cylinder portion 53 of the engine 51 is positioned below a front part of the fuel tank 41.

Note that reference numeral 91 indicates an upper cross pipe bridged across rear parts of the right and left main frames 22 to extend in the vehicle width direction, and the front ends of the right and left seat rails 24 are connected to the upper cross pipe 91. Reference numeral 92 indicates paired right and left reinforcement pipes bridged across a lower part of the head pipe 21 and the main frames 22 in a tilted manner.

Figure 3A:
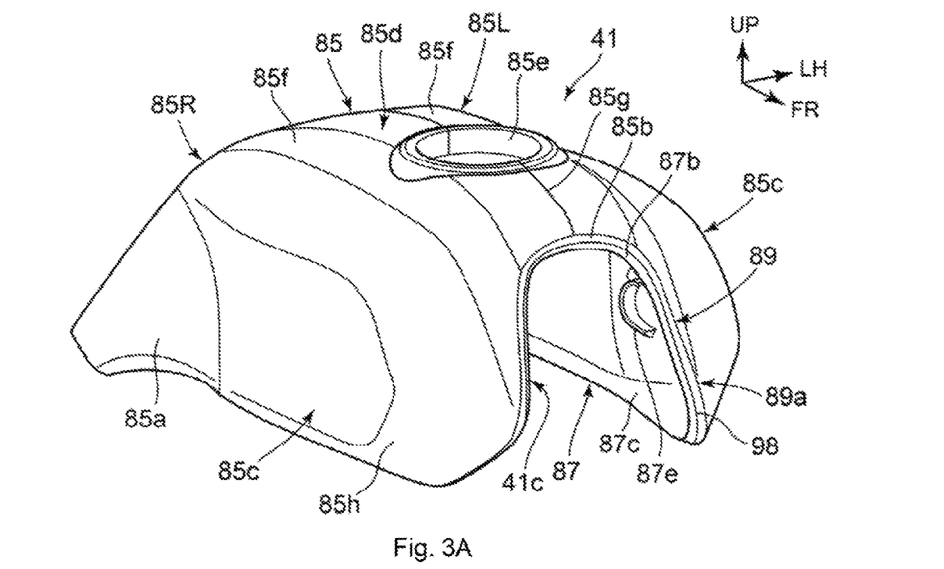
FIG. 3A is a perspective view of the fuel tank.
Figure 3B:
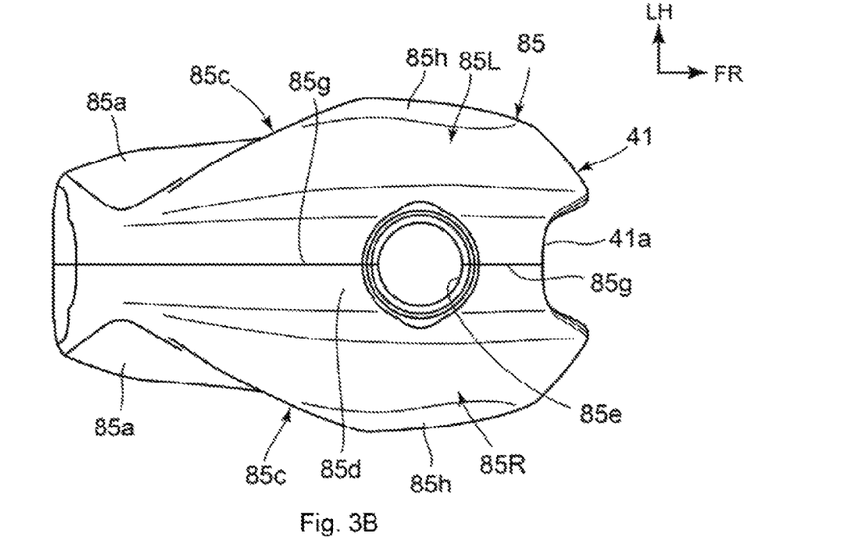
FIG. 3B is a plan view of the fuel tank.

FIGS. 3A, 3B show explanatory drawings for describing the fuel tank 41. FIG. 3A is a perspective view of the fuel tank 41, and FIG. 3B is a plan view of the fuel tank 41.

As shown in FIG. 3A, the body 85 and the bottom 87 have a body flange 85b and a bottom flange 87b, respectively, which are formed to be continuous over the entire outlines thereof. The body flange 85b and the bottom flange 87b are placed on top of one another and welded together. The part where the body flange 85b and bottom flange 87b are placed on top of one another and welded together is referred to as a welding portion 89.

The body 85 is configured of right and left body side walls 85c, 85c, and a body upper wall 85d connecting the upper ends of the body side walls 85c, 85c.

The knee grip portion 85a extends from the longitudinal center part to rear part of the body side wall 85c. A filler opening installation hole 85e, in which a filler opening part including a filler opening (not shown) is provided, is opened at the center in the vehicle width direction of a front part of the body upper wall 85d.

The bottom 87 includes right and left bottom side walls 87c, 87c (only one bottom side wall 87c is shown), and the bottom side walls 87c, 87c each includes a hook portion 87e for locking a front part of the fuel tank 41 to the body frame 11 (see FIG. 2) side. Note that a rear end part of the fuel tank 41 is fixed to the body frame 11 through a fixing plate (not shown).

In addition, the body 85 is formed by joining together, by welding, laterally divided two body half bodies 85L, 85R at the center in the vehicle width direction. In other words, each of the body half bodies 85L, 85R is integrally formed of the body side wall 85c and a body upper wall half body 85f, which extends inward in the vehicle width direction from the upper end of the body side wall 85c. The body upper wall half body 85f is one of right and left parts, into which the body upper wall 85d is divided at the center in the vehicle width direction.

As shown in FIG. 3B, the fuel tank 41 has a symmetrical shape, and has, in its front end part, a front end concave portion 41a positioned behind the head pipe 21 (see FIG. 1).

In plan view, the body 85 is formed by joining together, by welding, the right and left body half bodies 85L, 85R at a joint portion 85g extending in the longitudinal direction. The body side wall 85c includes a bulging portion 85h, where a front part of the body side wall bulges outward in the vehicle width direction, and the knee grip portion 85a, which gradually narrows toward the rear from the bulging portion 85h. The knee grip portion 85a is recessed deeper than the front part, and gradually widens outward in the vehicle width direction toward the lower side. The rear end of the body upper wall 85d extends substantially linearly in the vehicle width direction.

Figure 4:
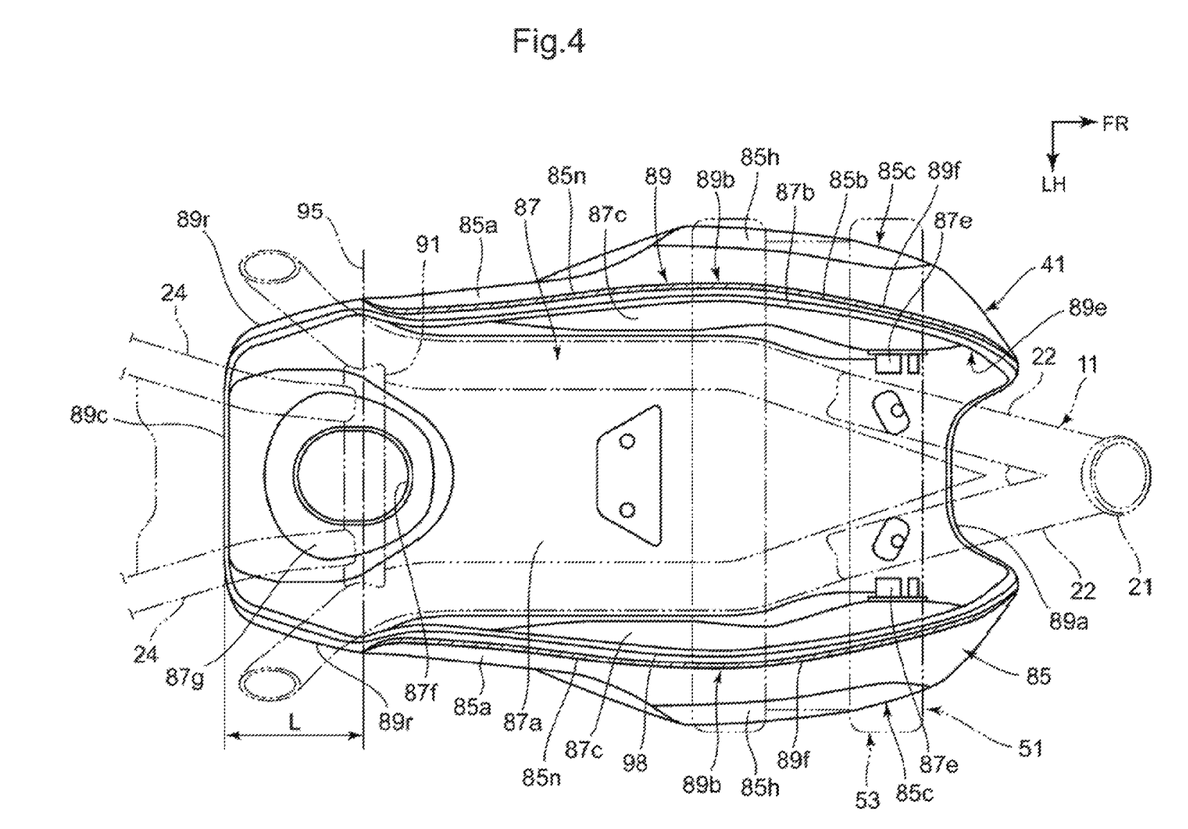
FIG. 4 is a bottom view of the fuel tank and a body frame.

FIG. 4 is a bottom view of the fuel tank 41 and the body frame 11.

The bottom 87 of the fuel tank 41 is formed of the right and left bottom side walls 87c, 87c, and the bottom upper wall 87a integrally connecting the bottom side walls 87c, 87c.

A pump opening 87f for inserting a fuel pump (not shown) into the fuel tank 41, and a pump attachment portion 87g formed on the edge of the pump opening 87f to attach the fuel pump, are formed in a rear part of the bottom upper wall 87a.

The bottom 87 has the bottom flange 87b formed on its circumferential edge, and the bottom flange 87b is placed on and welded to the body flange 85b, which is formed on the circumferential edge of the body 85.

The welding portion 89 between the body flange 85b and the bottom flange 87b is a strip-like endless part, and is configured of a front welding portion 89a facing the head pipe 21, right and left lateral welding portions 89b, 89b extending in the longitudinal direction, and a rear welding portion 89c positioned in a rear end part of the fuel tank 41.

Each of the lateral welding portions 89b is configured of: a front lateral welding portion 89f on the front side of a straight line 95, which passes through the cross-sectional center of the upper cross pipe 91 and extends in the vehicle width direction; and a rear lateral welding portion 89r on the rear side of the straight line 95. The front lateral welding portion 89f and the rear lateral welding portion 89r are continuous with each other.

The cylinder portion 53 of the engine 51 is arranged close to and below the right and left bulging portions 85h, 85h. The right and left lateral welding portions 89b, 89b are positioned on the inner side in the vehicle width direction of right and left end parts of the cylinder portion 53. Since the cylinder portion 53 thus protrudes to the right and left sides, the lateral welding portion 89b is made less recognizable from the side obliquely lower direction of the vehicle body.

Figure 5A:
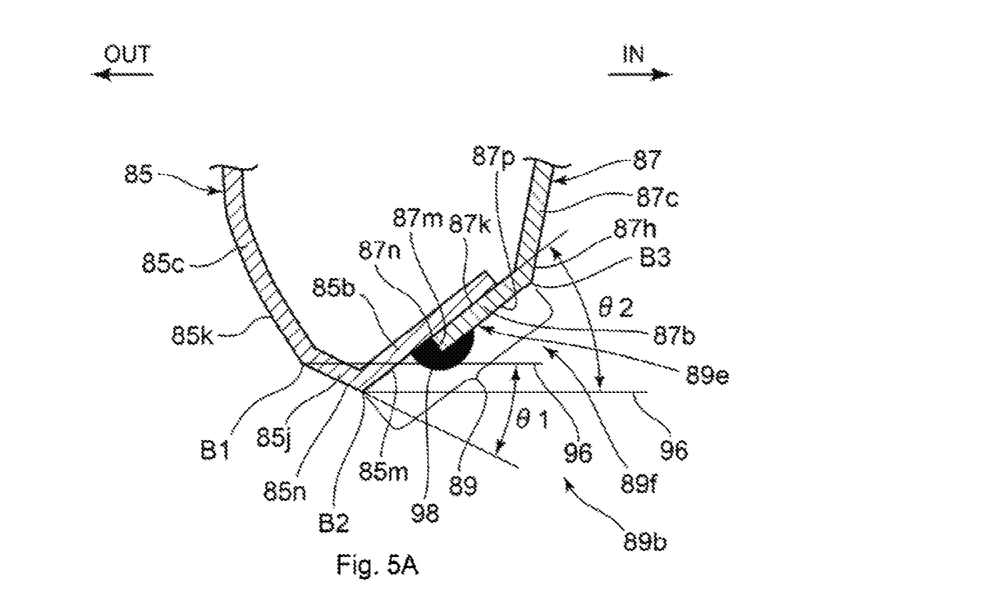
FIG. 5A is a cross-sectional view taken along line VA-VA of FIG. 2.
Figure 5B:
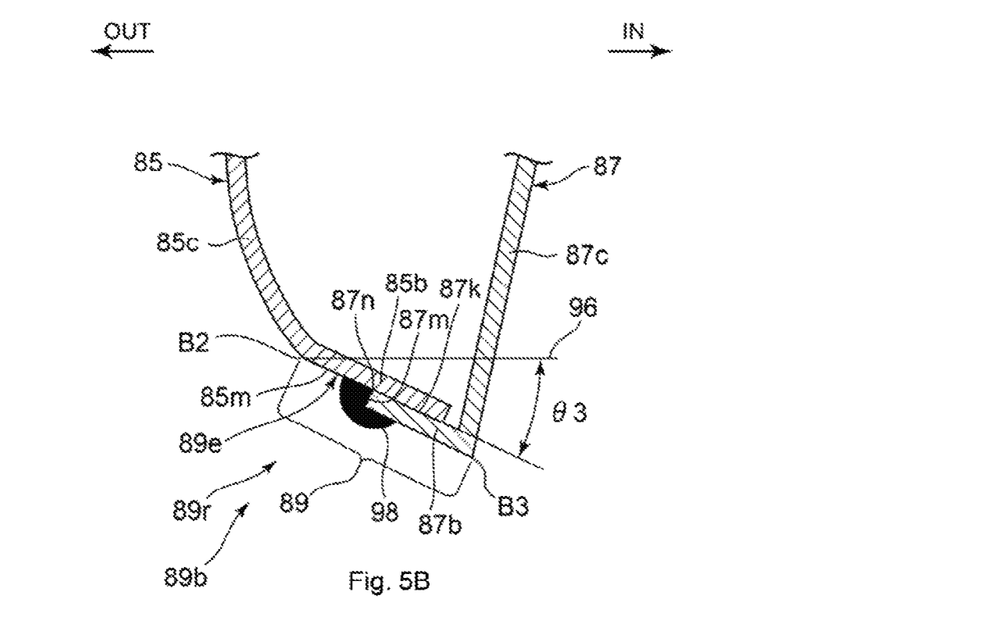
FIG. 5B is a cross-sectional view taken along line VB-VB of FIG. 2.

FIGS. 5A, 5B show cross-sectional views of the lateral welding portion 89b of the fuel tank 41. FIG. 5A is a cross-sectional view taken along line VA-VA of FIG. 2, and FIG. 5B is a cross-sectional view taken along line VB-VB of FIG. 2. Note that in FIGS. 5A, 5B, reference sign OUT indicates the outer side in the vehicle width direction, and reference sign IN indicates the inner side in the vehicle width direction.

FIG. 5A shows a cross section of the front lateral welding portion 89f. A body lower bent portion 85j bent inward in the vehicle width direction, and the body flange 85b are formed in this order from the outer side in the vehicle width direction, in a lower end part of the body 85 (specifically, the body side wall 85c). Here, points on an outer surface 85k of the body 85 where the body lower bent portion 85j and the body flange 85b bend are defined as a first bending point B1 and a second bending point B2, respectively.

The body lower bent portion 85j is bent downward for an angle θ1, with respect to a horizontal line 96. Meanwhile, the body flange 85b is bent upward for an angle θ2, with respect to the horizontal line 96.

Also, the bottom flange 87b is formed in a lower end part of the bottom 87 (specifically, the bottom side wall 87c). Here, a point on an outer surface 87h of the bottom 87 where the bottom flange 87b bends is defined as a bottom bending point B3. The bottom flange 87b is bent downward for the same angle (θ2) or substantially the same angle as the body flange 85b of the body 85, with respect to the horizontal line 96.

An inner surface 87k of the bottom flange 87b is placed on an outer surface 85m of the aforementioned body flange 85b, and a corner formed of the outer surface 85m of the body flange 85b and an end surface 87m of the bottom flange 87b is fillet welded, to form a lap joint. Arc welding such as MIG welding and TIG welding is used as the welding method. Note that reference numeral 87n indicates a corner formed of the end surface 87m and an inner surface 87k of the bottom flange 87b, and reference numeral 98 indicates a weld bead formed in the corner formed of the outer surface 85m of the body flange 85b and the end surface 87m of the bottom flange 87b, and the periphery of the corner.

The welding portion 89 is formed of the body flange 85b, the bottom flange 87b, and the weld bead 98. Here, a part of the outer surface 85m of the body flange 85b which is not overlapped with the bottom flange 87b, an outer surface 87p of the bottom flange 87b, and the end surface 87m of the bottom flange 87b constitute a welding surface 89e included in the welding portion 89. The welding surface 89e is a strip-like endless surface in the welding portion 89, and faces the outer part of the fuel tank 41 (see FIG. 4). The welding surface 89e of the front lateral welding portion 89f is directed inward in the vehicle width direction toward the obliquely lower direction (right obliquely lower direction in FIG. 5). Note that in drawings other than cross-sectional drawings, the weld bead 98 is depicted as a line in the welding portion 89 for the sake of convenience.

The body lower bent portion 85j of the body 85 is formed along the welding portion 89, and is a part for emphasizing the lower end of the body 85, i.e., the lower end of the fuel tank 41, when the fuel tank 41 is viewed from the lateral side. The body lower bent portion 85j can be formed easily, since it is bent together when bending the body flange 85b.

Note that reference numeral 85n indicates an outer surface of the body lower bent portion 85j, and the outer surface 85n is a design surface (hatched part in FIG. 4) formed along the welding surface 89e.

The area from the second bending point B2 of the body 85 to the bottom bending point B3 of the bottom 87 is the welding portion 89.

Since the body flange 85b is bent above the horizontal in the front lateral welding portion 89f as mentioned above, the front lateral welding portion 89f is not visible from the lateral outer side, and cannot be seen even when the fuel tank 41 is viewed from the lateral obliquely lower direction of the fuel tank 41. Hence, appearance can be improved.

Also, since there is no flange that is welded and protruding downward as in conventional fuel tanks, the volume of the fuel tank 41 can be increased accordingly, or a small and slim fuel tank 41 can be displayed to give a fresh impression.

FIG. 5B shows a cross section of the rear lateral welding portion 89r. The body flange 85b is formed in a lower end part of the body side wall 85c. The body flange 85b is bent downward for an angle θ3, with respect to the horizontal line 96. The angle of bend of the body flange 85b is continuously varied from the front lateral welding portion 89f (see part A of FIG. 5), and is the angle θ3.

Also, the bottom flange 87b is formed in a lower end part of the bottom side wall 87c. The bottom flange 87b is bent upward for the same angle (θ3) or substantially the same angle as the body flange 85b of the body 85, with respect to the horizontal line 96.

The inner surface 87k of the bottom flange 87b is placed on the outer surface 85m of the aforementioned body flange 85b, and a corner formed of the outer surface 85m of the body flange 85b and the end surface 87m of the bottom flange 87b is fillet welded, to form a lap joint.

The welding surface 89e of the rear lateral welding portion 89r is directed outward in the vehicle width direction toward the obliquely lower direction (left obliquely lower direction in FIG. 5).

The body lower bent portion 85j (see FIG. 5A) of the body 85 gradually narrows from the front lateral welding portion 89f toward the rear lateral welding portion 89r, is eliminated along the way, and is not formed in the rear lateral welding portion 89r.

Since the body flange 85b is bent below the horizontal as mentioned above, the rear lateral welding portion 89r is visible from the lateral outer side. Note, however, that a longitudinal length L (see FIGS. 2 and 4) of the rear lateral welding portion 89r is short, and when the rider mounts the vehicle, his/her leg part hides the rear lateral welding portion 89r. Hence, appearance is less likely to be degraded.

As compared to the rear lateral welding portion 89r, the front lateral welding portion 89f (see part A of FIG. 5) has a longer longitudinal length than the length L, and therefore improves appearance even more.

Figure 6:
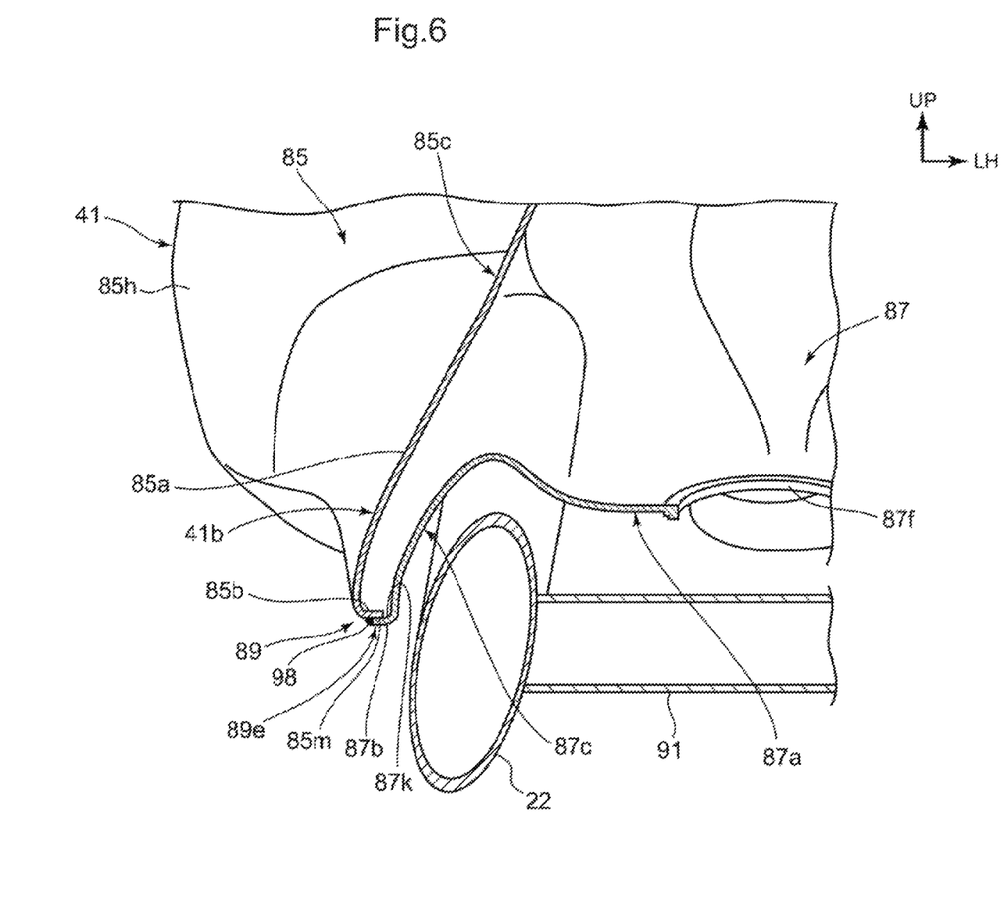
FIG. 6 is a cross-sectional view taken along line VI-VI of FIG. 2.

FIG. 6 is a cross-sectional view taken along line VI-VI of FIG. 2.

The knee grip portion 85a of the fuel tank 41 gradually widens outward in the vehicle width direction, toward the lower side. The body flange 85b in the lower end part of the knee grip portion 85a is mildly bent inward in the vehicle width direction, in the horizontal or lower than horizontal direction. Also, the bottom flange 87b is bent outward in the vehicle width direction at the same or substantially the same angle as the body flange 85b. Then, the inner surface 87k of the bottom flange 87b is placed on the outer surface 85m of the body flange 85b, and a corner formed of the outer surface 85m of the body flange 85b and the end surface 87m (see FIG. 5A) of the bottom flange 87b is fillet welded, to form a lap joint. Thus, the welding surface 89e of the welding portion 89 becomes horizontal or substantially horizontal.

Since the leg part of the rider is positioned on the outer side of the knee grip portion 85a and the main frame 22 is close to the inner side of the knee grip portion, a narrow portion 41b needs to be formed on the inner side of the knee grip portion 85a. In the embodiment, the horizontal or substantially horizontal welding portion 89 is provided in each of the body flange 85b and the bottom flange 87b, at the lower end of the narrow portion 41b formed in the knee grip portion 85a. Hence, the narrow portion 41b can be formed easily. If the narrow portion is to be formed of a single plate, i.e., only the body 85 or the bottom 87, for example, it is difficult to manufacture the die for forming the narrow portion. That is, it is difficult to form the narrow portion.

When the body flange 85b is mildly bent inward in the vehicle width direction in the horizontal or lower than horizontal direction, the die used for bending can be drawn from the tank easily after bending the body flange 85b. Also, since the angle at which the body flange 85b is tilted relative to the horizontal is not great, the welding portion 89 can be made less recognizable.

In the knee grip portion 85a, the main frame 22 and the upper cross pipe 91 connecting the right and left main frames 22 are provided on the inner side in the vehicle width direction, and the welding surface 89e of the welding portion 89 becomes horizontal or substantially horizontal on the outer side in the vehicle width direction of the upper cross pipe 91. In other words, the direction in which the welding surface 89e of the welding portion 89 is tilted varies, on the outer side in the vehicle width direction of the upper cross pipe 91.

Referring back to FIG. 2, the welding surface 89e is tilted such that its inner edge is above the horizontal in a position in front of the upper cross pipe 91, and is below the horizontal in a position behind the upper cross pipe 91. Additionally, the welding surface 89e is horizontal or substantially horizontal at the side of the upper cross pipe 91. Thus, the tilt of the welding surface 89e varies continuously in the lateral welding portion 89b.

In side view, the position of the upper cross pipe 91 is where the lower edge of the fuel tank 41 starts to protrude slightly downward from the front part of the fuel tank 41, and is also where the main frame 22 protrudes from the lower edge of the fuel tank 41 and is visible. Since a border between the two tilts by which the welding surface 89e is made visible and non-visible from the lateral side is provided in such a position of the upper cross pipe 91, the border can be made less recognizable.

Figure 7A:
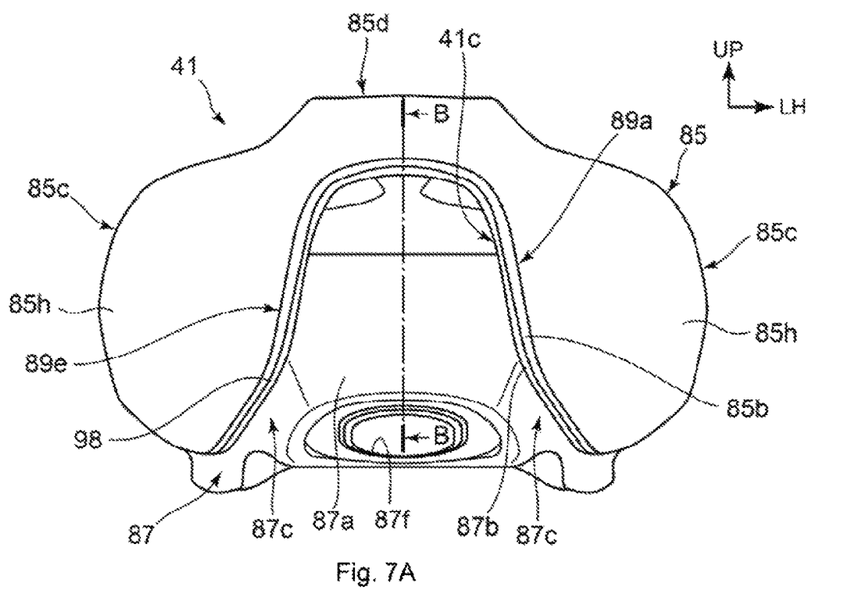
FIG. 7A is a front view of the fuel tank.
Figure 7B:
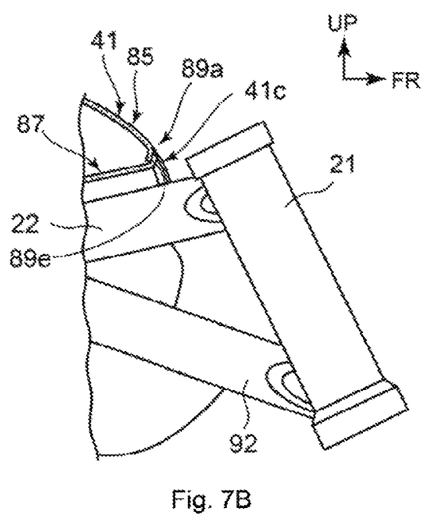
FIG. 7B is a drawing in which the body frame is depicted over a cross section of the fuel tank taken along line B-B of FIG. 7A.
Figure 7C:
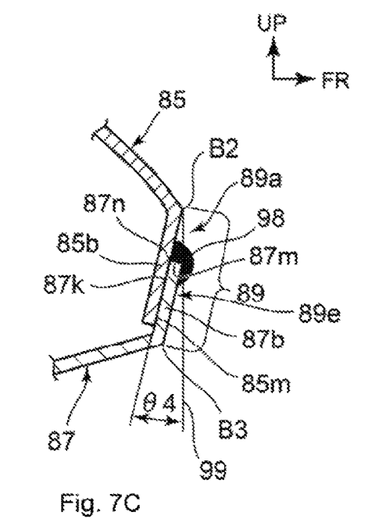
FIG. 7C is an enlarged view of a main part of FIG. 7B.

FIGS. 7A, 7B, 7C show drawings for describing the front welding portion 89a of the fuel tank 41. FIG. 7A is a front view of the fuel tank 41, FIG. 7B is a drawing in which the body frame 11 is depicted over a cross section of the fuel tank 41 taken along line B-B of FIG. 7A, and FIG. 7C is an enlarged view of a main part of FIG. 7B.

As shown in FIG. 7A, a front opening 41c through which a front part of the body frame 11 (see FIG. 1) passes is formed in a front end part of the fuel tank 41, and the front welding portion 89a is provided on an edge part of the front opening 41c.

The front opening 41c is formed such that it gradually widens from upper to lower sides. The front welding portion 89a is formed in a similar manner to the front opening 41c, and is visible from the front.

As shown in FIG. 7B, the front welding portion 89a faces the head pipe 21 positioned at its front.

FIG. 7C is an enlarged view of the front welding portion 89a shown in FIG. 7B, where the body flange 85b is bent rearward for an angle θ4, with respect to a vertical line 99. Also, the bottom flange 87b is bent frontward for the same angle (θ4) or substantially the same angle as the body flange 85b of the body 85, with respect to the vertical line 99. In other words, the body flange 85b and the bottom flange 87b are tilted frontward.

The inner surface 87k of the bottom flange 87b is placed on the outer surface 85m of the body flange 85b, and a corner formed of the outer surface 85m of the body flange 85b and the end surface 87m of the bottom flange 87b is fillet welded, to form a lap joint.

The welding surface 89e of the front welding portion 89a is directed toward the front obliquely lower direction, i.e., is tilted frontward. Since the welding surface 89e of the front welding portion 89a is thus tilted frontward to face the head pipe 21, the front welding portion 89a can be made less recognizable from above, and appearance can be improved. Also, since the head pipe 21, the headlight 71 (see FIG. 1), and meters are arranged in front of the front welding portion 89a, the front welding portion 89a is less recognizable from the vehicle front. Moreover, when the front part of the fuel tank 41 is viewed from the front oblique direction of the vehicle, the welding surface 89e is viewed obliquely since the welding surface 89e of the front welding portion 89a faces the head pipe 21. Hence, the front welding portion 89a is less recognizable.

Figure 8A:
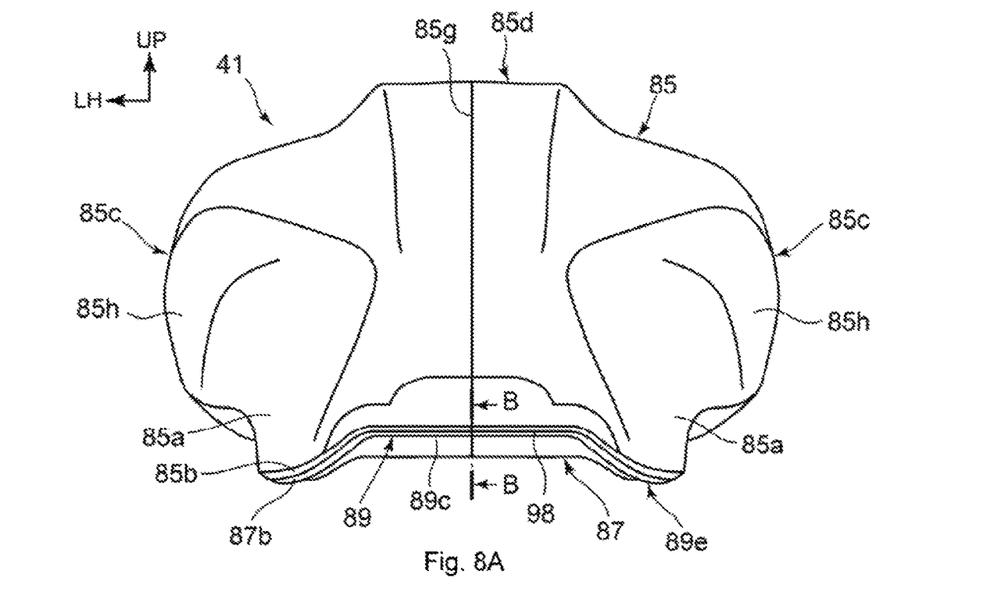
FIG. 8A is a rear view of the fuel tank.
Figure 8B:
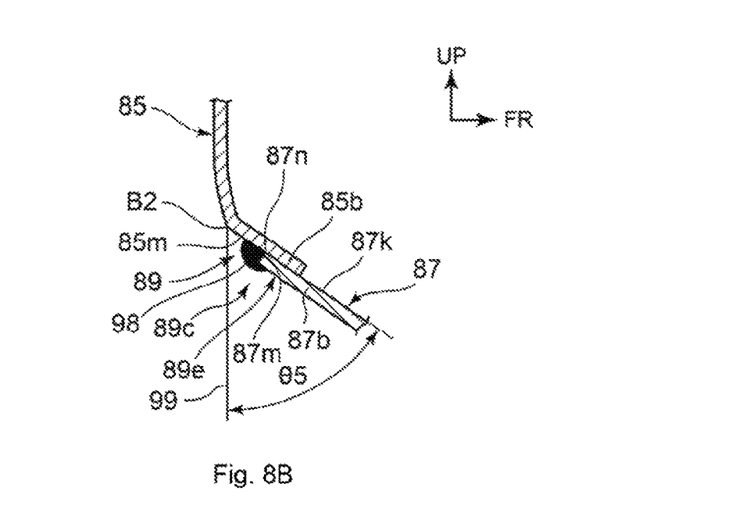
FIG. 8B is a cross-sectional view taken along line B-B of FIG. 8A.

FIGS. 8A, 8B show drawings for describing the rear welding portion 89c of the fuel tank 41. FIG. 8A is a rear view of the fuel tank 41, and FIG. 8B is a cross-sectional view taken along line B-B of FIG. 8A.

As shown in FIG. 8A, the rear welding portion 89c of the fuel tank 41 has a substantially horizontal center part in the vehicle width direction, and both end parts in the vehicle width direction tilted to gradually lower toward the outer side in the vehicle width direction.

As shown in FIG. 8B, in the rear welding portion 89c, the body flange 85b is bent frontward for an angle θ5, with respect to the vertical line 99. Also, the bottom flange 87b is bent rearward for the same angle (θ5) or substantially the same angle as the body flange 85b of the body 85, with respect to the vertical line 99. In other words, the welding surface 89e formed of the body flange 85b and the bottom flange 87b is tilted rearward.

The inner surface 87k of the bottom flange 87b is placed on the outer surface 85m of the body flange 85b, and a corner formed of the outer surface 85m of the body flange 85b and the end surface 87m of the bottom flange 87b is fillet welded, to form a lap joint.

The welding surface 89e of the rear welding portion 89c is directed toward the rear obliquely lower direction, i.e., is tilted rearward. Since the welding surface 89e of the rear welding portion 89c is thus tilted rearward, when the fuel tank 41 is viewed as a unit, the rear welding portion 89c is not visible from above, and is visible from the rear. When the fuel tank 41 is mounted on the vehicle, the rear part of the fuel tank 41 is covered with the seat 42 from above and from the side as in FIG. 2, and therefore the rear welding portion 89c is not exposed to the outside, and does not degrade appearance.

As has been described, the body flange 85b is bent above the horizontal in the front lateral welding portion 89f (see FIG. 5A), and is bent below the horizontal in the rear lateral welding portion 89r (see FIG. 5B). Also, the body flange 85b extends substantially horizontally in the knee grip portion 85*a* (see FIG. 6), tilts frontward in the front welding portion 89*a* (see FIG. 7C), and tilts rearward in the rear welding portion 89*c* (see FIG. 8B).

When the entire lateral welding portion 89*b* of the body flange 85*b* is bent above the horizontal, for example, it is difficult to draw the die for bending the body flange from the tank. On the other hand, in the embodiment, the body flange 85*b* is bent above the horizontal in the front lateral welding portion 89*f*, and bent below the horizontal in the rear lateral welding portion 89*r*. Hence, the die for bending the body flange 85*b* can be drawn rearward more easily, while vertically moving and tilting the die.

As has been described above with reference to FIGS. 1 to 3 and FIG. 5A, 5B, in the fuel tank 41 of the motorcycle 10, which is a straddle type vehicle, including the body frame 11 in which the main frames 22 are connected to a rear part of the head pipe 21, the fuel tank 41 and the seat 42 being supported to the body frame 11 in this order from the front at the rear of the head pipe 21, the fuel tank being formed by placing the body 85, which is formed of an outer plate on the upper side, on top of the bottom 87, which is formed of the bottom plate on the lower side, and welding them together, and the rear end of the fuel tank being arranged below the seat 42, the body 85 is formed by integrally joining, at the center in the vehicle width direction, the body half bodies 85L, 85R as laterally divided parts divided into two in the vehicle width direction, the body flange 85*b* as a body joint portion to be placed on and welded to the bottom 87, is formed on the entire outer circumferential edge of the body 85, a rear part (specifically, the rear lateral welding portion 89*r* side behind the straight line 95 (see FIG. 4)) of a side part (lateral welding portion 89*b* side) of the body flange 85*b* protrudes inward in the vehicle width direction toward the obliquely lower direction, and a part of the side part other than the rear part (specifically, the front lateral welding portion 89*f* side in front of the straight line 95) of the body flange 85*b* protrudes inward in the vehicle width direction toward the obliquely upper direction.

According to this configuration, the rear part of the side part of the body flange 85*b* protrudes inward in the vehicle width direction toward the obliquely lower direction. Hence, when forming each of the body half bodies 85L, 85R of the body 85, the die can be drawn easily from the rear part side of the side part of the body flange 85*b*, even when the die for bending the body flange 85*b* is an integral die.

Also, as described with reference to FIGS. 4 and 6, each of the body 85 and the bottom 87 includes the body side wall 85*c* and the bottom side wall 87*c*, the body flange 85*b* is formed in the lower end part of the body side wall 85*c* of the body 85, the bottom flange 87*b* as a bottom joint portion to be placed on and welded to the body flange 85*b*, is formed in the lower end part of the bottom side wall 87*c* of the bottom 87, the body flange 85*b* and the bottom flange 87*b* are welded to form the welding surface 89*e*, the knee grip portion 85*a* is formed in the body side wall 85*c* of the body 85 from the longitudinal center part to the rear part thereof, and in the knee grip portion 85*a*, the body flange 85*b*, which is bent horizontally or substantially horizontally inward in the vehicle width direction, and the bottom flange 87*b*, which is bent horizontally or substantially horizontally outward in the vehicle width direction, are placed on top of one another and welded together. Hence, the welding portion 89 can be formed by bending the body flange 85*b* and the bottom flange 87*b* horizontally or substantially horizontally, placing them on top of one another, and welding them together. Since the conventional steps of bending the parts substantially horizontally and then bending them vertically are eliminated, the body 85 and bottom 87 require less bending steps. Also, by forming the knee grip portion 85*a* in this manner, the body side wall 85*c* and the bottom side wall 87*c* can be brought closer to each other than to form the knee grip portion by bending a single member. This allows the knee grip portion 85*a* to bulge less toward the outer side in the vehicle width direction.

Also, as described with reference to FIG. 6, the knee grip portion 85*a* is formed such that it is wider in the vehicle width direction on the lower side than on the upper side, and the body flange 85*b* is bent at a moderate angle directed below the horizontal. Hence, the die for bending can be drawn easily from the edge part of the body 85, and the lower end part of the body 85 can be made less recognizable.

Also, as described with reference to FIG. 4 and FIG. 5A, 5B, the outer surface 85*n* as a design surface is formed along the welding surface 89*e*, which is formed of the body flange 85*b* and the bottom flange 87*b*. Hence, when the lower part of the fuel tank 41 is viewed from the side of the vehicle body, the outer surface 85*n* is more likely to gather attention, and the welding surface 89*e* can be made less recognizable.

Also, as described with reference to FIG. 7A, 7B, 7C, the welding surface 89*e* facing the head pipe 21 is provided in the front part of the fuel tank 41. Hence, the clearance between the welding surface 89*e* and the head pipe 21 can be reduced, and the volume of the fuel tank 41 can be enlarged.

Also, since the welding surface 89*e* facing the head pipe 21 is directed toward the obliquely lower direction, the welding surface 89*e* can be made less recognizable from above and other directions.

Also, as described with reference to FIGS. 2 and 4, the engine 51 is arranged below the fuel tank 41, and the cylinder portion 53 of the engine 51 projects farther outward in the vehicle width direction than the welding surface 89*e*. Hence, the welding surface 89*e* is less likely to be viewed from the obliquely lower direction on the outer side in the vehicle width direction, and is made less recognizable.

Also, as described with reference to FIG. 2, FIG. 5A, 5B, and FIG. 6, the welding surface 89*e* formed in the welding portion 89 between the body flange 85*b* and the bottom flange 87*b* has a continuously varying tilt angle, and therefore is directed inward in the vehicle width direction toward the obliquely lower direction in a position in front of the knee grip portion 85*a*, and is directed outward in the vehicle width direction toward the obliquely lower direction in a position behind the knee grip portion 85*a*. Hence, by continuously varying the tilt angle of the welding surface 89*e*, bending and welding work of the body flange 85*b* and the bottom flange 87*b* can be performed efficiently, and workability can be improved.

The embodiment described above only shows an aspect of the present invention, and modifications and applications can be made arbitrarily without departing from the gist of the invention.

For example, although in the knee grip portion 85*a* of the embodiment, the welding surface 89*e* of the welding portion 89 becomes horizontal or substantially horizontal on the outer side in the vehicle width direction of the upper cross pipe 91 as in FIGS. 2 and 6, the invention is not limited to this. The welding surface 89*e* does not necessarily have to become horizontal or substantially horizontal on the outer side in the vehicle width direction of the upper cross pipe 91, and the welding surface 89*e* may become horizontal or substantially horizontal in other parts, as long as the part is within the area of the knee grip portion 85*a*.

The present invention is not limited to application to the motorcycle 10, and is applicable to straddle type vehicles including those other than the motorcycle 10. Note that a straddle type vehicle includes general vehicles ridden by straddling the vehicle body, and is a vehicle including not only a motorcycle (including a motor bicycle), but also a three-wheeled or four-wheeled vehicle categorized as an ATV (All Terrain Vehicle).

We claim:

1. A fuel tank of a straddle type vehicle, the vehicle comprising a body frame in which a main frame is connected to a rear part of a head pipe, the fuel tank and a seat being supported to said body frame in this order from the front at the rear of said head pipe, wherein the fuel tank comprising: a body and a bottom, the fuel tank being formed by placing the body, which is formed of an outer plate on the upper side, on top of the bottom, which is formed of a bottom plate on the lower side, and welding them together, and the rear end of the fuel tank being arranged below the seat, wherein:

said body is constituted by integrally joining laterally divided parts divided into two parts in the vehicle width direction;

the body includes a body joint portion placed on and welded to said bottom, the body joint portion being disposed on an entire outer circumferential edge of said body;

said body joint portion includes a side part disposed along a longitudinal side of the fuel tank, a longitudinal rear part of the side part of said body joint portion protrudes inward in the vehicle width direction and toward an obliquely lower direction; and a part of the side part other than the rear part of said body joint portion protrudes inward in the vehicle width direction and toward an obliquely upper direction.

2. The fuel tank of the straddle type vehicle according to claim 1, wherein:

each of said body and said bottom includes a side wall;

said body joint portion is disposed in a lower end part of the side wall of said body;

the bottom includes a bottom joint portion placed on and welded to said body joint portion, the bottom joint portion being disposed in a lower end part of the side wall of said bottom;

said body joint portion and said bottom joint portion are welded to constitute a welding surface;

a knee grip portion is disposed in the side wall of said body from a longitudinal center part to a rear part thereof; and in the knee grip portion, said body joint portion, which is bent substantially horizontally inward in the vehicle width direction, and said bottom joint portion, which is bent substantially horizontally outward in the vehicle width direction, are placed on top of one another and welded together.

3. The fuel tank of the straddle type vehicle according to claim 2, wherein:

said knee grip portion has a width wider in the vehicle width direction at a lower part thereof than at an upper part thereof; and said body joint portion is bent at a moderate angle directed lower with respect to the horizontal.

4. The fuel tank of the straddle type vehicle according to claim 2, wherein a design surface is disposed along said welding surface.

5. The fuel tank of the straddle type vehicle according to claim 2, wherein said welding surface facing said head pipe (21) is provided in a front part of said fuel tank.

6. The fuel tank of the straddle type vehicle according to claim 5, wherein said welding surface facing said head pipe is directed toward the obliquely lower direction.

7. The fuel tank of the straddle type vehicle according to claim 2, wherein:

an engine is arranged below said fuel tank; and a cylinder portion of the engine projects farther outward in the vehicle width direction than said welding surface.

8. The fuel tank of the straddle type vehicle according to claim 2, wherein said welding surface disposed in a welding portion between said body joint portion and said bottom joint portion has a continuously varying tilt angle such that the welding surface is directed inward in the vehicle width direction and toward the obliquely lower direction at a position in front of said knee grip portion, and is directed outward in the vehicle width direction and toward the obliquely lower direction at a position behind said knee grip portion, and is directed lower direction at said knee grip portion.

9. The fuel tank of the straddle type vehicle according to claim 2, wherein the body joint portion is a flange and the bottom joint portion is a flange.

* * * * *